United States Patent
Gallea et al.

(10) Patent No.: US 6,896,468 B2
(45) Date of Patent: May 24, 2005

(54) BATTERY INTERCHANGE SYSTEM FOR BATTERY POWERED FLOOR MAINTENANCE EQUIPMENT

(75) Inventors: Gregory P. Gallea, Watertown, MN (US); Laurence A. Jensen, Oakdale, MN (US)

(73) Assignee: Tennant Company, Minneapolis, MN (US)

( * ) Notice: Subject to any disclaimer, the term of this patent is extended or adjusted under 35 U.S.C. 154(b) by 117 days.

(21) Appl. No.: 10/348,459

(22) Filed: Jan. 21, 2003

(65) Prior Publication Data

US 2003/0154566 A1 Aug. 21, 2003

Related U.S. Application Data

(60) Provisional application No. 60/358,457, filed on Feb. 19, 2002.

(51) Int. Cl.$^7$ ............................................. B65G 67/02
(52) U.S. Cl. ...................... 414/395; 414/396; 414/401; 15/1; 15/49.1; 15/98
(58) Field of Search ............................ 15/1, 49.1, 50.1, 15/98, DIG. 1; 414/395, 396, 398, 400, 401

(56) References Cited

U.S. PATENT DOCUMENTS

| | | | |
|---|---|---|---|
| 3,876,086 A | * | 4/1975 | Kappei |
| 4,492,002 A | | 1/1985 | Waldhauser et al. |
| 5,032,775 A | | 7/1991 | Mizuno et al. |
| 5,089,037 A | * | 2/1992 | Marsolais |
| 5,360,307 A | * | 11/1994 | Schemm |
| 5,572,759 A | * | 11/1996 | Zachhuber |
| 5,646,494 A | | 7/1997 | Han |
| 6,023,813 A | | 2/2000 | Thatcher et al. |
| 6,357,070 B1 | | 3/2002 | Venard et al. |

FOREIGN PATENT DOCUMENTS

WO     WO 95/09557     4/1995

OTHER PUBLICATIONS

"Practical Requirements for a Domestic Vacuum–Cleaning Robot" F. Jenkins, pp. 85–90.
"An Expert Autonomous Vacuum Cleaner Robot" G. W. Leng, ACM 1988, pp. 598–604.
"Cleaning Robots" M. Schofield, Service Robot—An International Journal, vol. 1, 1995, pp. 11–16.
"Sweeping Revelations From A First Time Robot–User" C. W. Ward, pp. 14–1 through 14–6.
"HelpMate: A Service Robot Success Story" J. M. Evans, Service Robot—An International Journal, vol. 1, 1995 pp. 19–21.
"Robot Introduction To Cleaning Work In The East Japan Railway Company" H. Yaguchi, Advanced Robotics, vol. 10, pp 403–414.
"Path Planning and Guidance Techniques For an Autonomous Mobile Cleaning Robot" C. Hofner and G. Schmidt, pp. 610–617.
International Search Report for PCT/US03/02271.

* cited by examiner

*Primary Examiner*—Randall Chin
(74) *Attorney, Agent, or Firm*—Altera Law Group, LLC

(57) ABSTRACT

A battery powered floor maintenance machine is alignable with a battery docking station that can slidably receive a spent battery assembly from the floor maintenance machine. The floor maintenance machine includes locking and aligning mechanisms to safely attach the machine to the docking station. Once attached, the battery assembly is slid onto the docking station for recharge. The floor machine can be removed from the docking station and attached to a second charging station with a fully charged battery assembly thereon. The battery assembly can be slid from the second charging station to the floor maintenance machine, allowing the machine to be returned to service.

13 Claims, 6 Drawing Sheets

BATTERY INTERCHANGE SYSTEM FOR BATTERY POWERED FLOOR MAINTENANCE EQUIPMENT This is a utility application of provisional application Ser. No. 60/358,457, filed Feb. 19, 2002.

FIELD OF THE INVENTION

The present invention relates generally to floor maintenance or conditioning machines, and particularly those machines employing one or more floor maintenance or conditioning appliances or tools that perform one or more tasks including, among others, scrubbing, sweeping, polishing or burnishing. More specifically, the present invention is particularly directed to battery powered floor maintenance equipment.

BACKGROUND OF THE INVENTION

Surface maintenance machines that perform a single surface maintenance or surface conditioning task are, of course, well known. Surface maintenance machines are generally directed to maintaining floors, including both hard surfaces and soft surfaces such as carpets. The term floor, as used herein, refers to any support surface, such as, among others, floors, pavements, road surfaces, ship decks, and the like, including those surfaces having fabric, (e.g. carpet), thereon.

Each of the aforesaid surface maintenance machines may have one or more motorized drivers coupled to a floor maintenance tool for, among others, burnishing, polishing, scrubbing, and/or sweeping. The motorized driver may be an electrical motor, pneumatic motor, or the like, for performing the desired operation. For example, the motorized driver may be an electrical motor having a shaft coupled to a burnishing pad driver assembly for causing circular motion of the burnishing pad.

Commonly such floor maintenance machines, particularly walk-behind propelled floor maintenance machines, are battery powered to both propel the machines as well as operate the maintenance tools typically driven by one or more electrical motors. Further, present day floor maintenance machines include a variety of electrically powered pumps, valves, liquid dispensers, electrical system controls, and the like.

Such battery powered floor maintenance machines have a limited self powered operation time dependent upon the electrical storage capacity of the batteries. Once the battery power is below a particular level, the batteries must be recharged. During the recharge time, the machine is then no longer available for service.

For large floor maintenance operations, multiple machines are commonly employed; some being operated, and others having their batteries recharged. Alternatively, separate batteries could be recharged while the machine is in service. In turn, each of the "on-board" batteries may be interchanged with those previously being recharged. This of course is not only quite laborious, but brings up a plethora of safety issues including, but not limited to, back injuries due to lifting and positioning the heavy batteries, finger smashing, acid spills, and other bodily injuries. Further, the chance of electrical connection error may cause explosions, fusing/welding of metal parts, and/or battery damage.

Thus there is a need for a safe system for increasing total daily machine operation time without the need for purchasing multiple machines, and without employing labor intensive and unsafe battery replacing techniques known in the art. The present invention fulfills these and other needs, and addresses other deficiencies of prior art implementations.

SUMMARY OF THE INVENTION

To overcome the limitations in the prior art described above, and to overcome other limitations that will become apparent upon reading and understanding the present specification, the present invention discloses an electrically powered floor maintenance machine. The floor maintenance machine includes a docking side and a battery assembly slidably attached between a front end and a back end of the floor maintenance machine. The battery assembly is slidable away from the floor maintenance machine at the docking side. A locking mechanism is attached to the docking side of the floor maintenance machine. The docking side of the floor maintenance machine is alignable with a docking station so that the locking mechanism is engagable with the docking station. The battery assembly is slidable from the floor maintenance machine to a slidable receiving member of the docking station when the locking mechanism is engaged with the docking station.

The floor maintenance machine may further include an alignment member attached to the docking side of the floor maintenance machine. The alignment member is slidably connectable to an alignment receiving member of the docking station. The alignment member can be retractable within the floor maintenance machine.

In one arrangement, the locking mechanism includes a locking arm with a hook-shaped attachment end. A lever handle is pivotably attached to the floor maintenance machine and the locking arm. The hook-shaped attachment end engages a lock receiving mechanism on the docking station.

In another embodiment of the present invention, a method of interchanging a first battery assembly from an electrically powered floor maintenance machine involves maneuvering the floor maintenance machine to align a docking side of the floor maintenance machine to a first docking station. A locking mechanism of the floor maintenance machine is engaged with a lock receiving mechanism of the first docking station to positively attach the floor maintenance machine to the first docking station. The first battery assembly is slid from the floor maintenance machine to the first docking station to unload the first battery assembly. The locking mechanism is disengaged to release the floor maintenance machine from the first docking station.

Aligning the docking side of the floor maintenance machine to a first docking station may involve slidably engaging an alignment member of the floor maintenance machine with an alignment receiving member of the first docking station. Aligning the docking side of the floor maintenance machine to the first docking station may involve maneuvering the floor maintenance machine to contact a set of rollers on the first docking station. Engaging the locking mechanism of the floor maintenance machine with a lock receiving mechanism of the first docking station may also disengage a battery latching mechanism of the docking station to allow the first battery assembly to slide onto the docking station.

In one aspect of the method, disengaging the locking mechanism also engages a battery holding mechanism of the docking station to prevent the first battery assembly from sliding on the docking station.

The method may involve maneuvering the floor maintenance machine to align the docking side of the floor maintenance machine to a second docking station. The locking mechanism of the floor maintenance machine is engaged with a lock receiving mechanism of the second docking station to positively attach the floor maintenance machine to the second docking station. A second battery assembly is slid from the second docking station to the floor maintenance machine to load the second battery assembly.

In another embodiment of the present invention, a floor maintenance system includes an electrically powered floor maintenance machine. The floor maintenance machine includes a battery assembly slidably attached to floor maintenance machine. The battery assembly is slidable away from a docking side of the floor maintenance machine. A locking mechanism is on the docking side of the floor maintenance machine.

The system includes a docking station with a receiving side. An alignment of the receiving side with the docking side of the floor maintenance machine defines an alignment configuration of the floor maintenance system. The docking station includes a battery receiving member for slidably receiving the battery assembly of the floor maintenance machine. The docking station also includes a lock receiving mechanism positively connectable to the locking mechanism of the floor maintenance machine in the alignment configuration of the floor maintenance system. A positive connection of the locking mechanism with the lock receiving mechanism defines an attached configuration of the floor maintenance system.

The system may also include an alignment member on a the docking side the floor maintenance machine and an alignment receiving member on the docking station. The alignment member is slidably connectable to the alignment receiving member in the alignment configuration of the floor maintenance system. The alignment receiving member of the docking station may include an alignment receiving pin. The alignment member of the floor maintenance machine may include an alignment arm with an alignment notch. The alignment notch is slidably connectable with the alignment receiving pin. The alignment member may be configured to be retractable within the floor maintenance machine.

In one arrangement, the docking station further comprises a plurality of rollers on the receiving side of the docking station. At least one of the rollers contacts the floor maintenance machine in the alignment configuration of the floor maintenance system.

The docking station may further include a battery latching mechanism that prevents sliding of the battery assembly on the battery receiving member when the floor maintenance system is not in the attached configuration. The battery latching mechanism allows sliding of the battery assembly on the battery receiving member in the attached configuration of the floor maintenance system. The battery latching mechanism may be connected to the lock receiving mechanism of the docking station so that the battery latching mechanism allows sliding of the battery assembly on the battery receiving member when the lock receiving mechanism is positively connected to the locking mechanism of the floor maintenance machine.

In one arrangement, the locking mechanism of the floor maintenance machine includes a locking arm with a hook-shaped attachment end. A lever handle is pivotably attached to the floor maintenance machine and the locking arm. The lock receiving mechanism may include a receiving pin. In one configuration, the battery receiving member comprises a pair of rails.

In another embodiment of the present invention, a battery replacement system for an electrically powered floor maintenance machine includes a battery means. The battery means is slidably attached to the floor maintenance machine. The battery means is slidable away from a docking side of the floor maintenance machine.

The system includes a docking station with a receiving side. An alignment of receiving side of the docking station with the docking side of the floor maintenance machine defines an alignment configuration of the floor maintenance machine. The docking station includes a battery receiving means for slidably receiving the battery means and a lock receiving means. The lock receiving means is positively connectable to a locking means of the floor maintenance machine in the alignment configuration of the floor maintenance machine. A positive connection of the locking means with the lock receiving means defines an attached configuration of the floor maintenance machine.

In one arrangement of the system, the docking station further comprises an alignment receiving means slidably connectable to an alignment means on the floor maintenance machine. The docking station may further inlcude a battery latching means that prevents sliding of the battery assembly on the battery receiving means when the floor maintenance machine is not in the attached configuration. The battery latching means allows sliding of the battery assembly on the battery receiving means in the attached configuration of the floor maintenance machine.

The battery replacement system may be configured so that the battery latching means is connected to the lock receiving means of the docking station so that the battery latching means allows sliding of the battery assembly on the battery receiving member when the lock receiving means is positively connected to the locking means of the floor maintenance machine.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
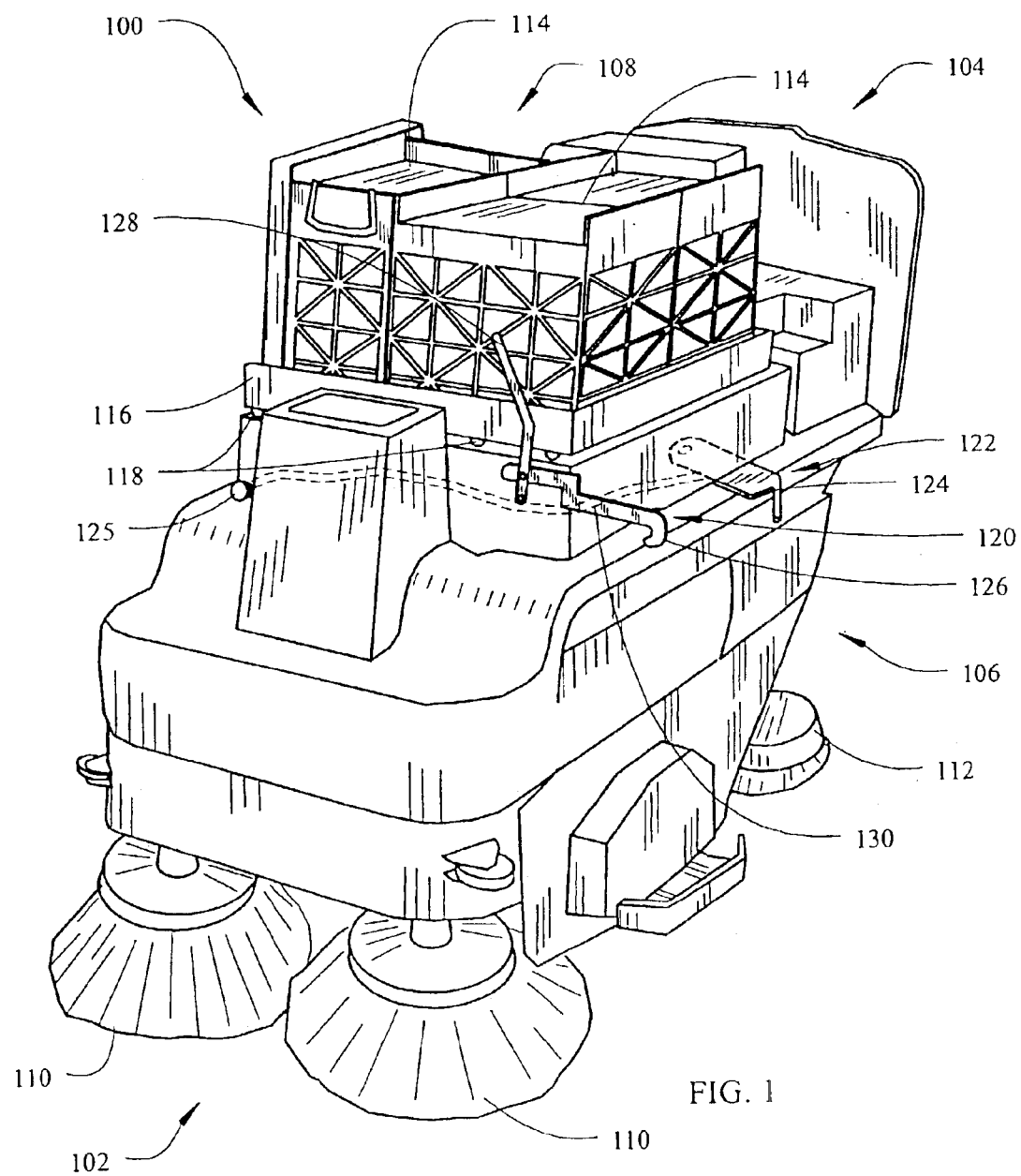
FIG. 1 is a perspective view of a floor maintenance machine according to one embodiment of the present invention.

While the invention is amenable to various modifications and alternative forms, specifics thereof have been shown by way of example in the drawings and will be described in detail herein. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF THE VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Referring now to FIG. 1, a floor maintenance machine, generally indicated by reference numeral 100, has a front end 102, a back end 104, and a docking side 106. The machine 100 includes a battery assembly 108 that can power the machine's drive system as well as powering accessories attached to the machine 100. In this example, floor maintenance accessories include front and rear brushes 110, 112. The battery assembly 108 is slidably attached to the machine 100 so that the battery assembly 108 can be slid from the machine from at least the docking side 106. In this embodiment, the battery assembly 108 includes at least one storage battery 114 on a slidable battery tray 116. A set of wheels 118 protrude from a lower portion the battery tray 116.

The floor maintenance machine 100 may include an alignment member 122 that is used to position the machine 100 during docking. The alignment member 122 typically slidably engages with the docking station, thereby allowing the machine 100 to be located by steering it into position. In this example, the alignment member 122 includes an alignment notch 124 suitable for contacting a pin or some other protruding member.

The alignment member 122 may be fixably attached to the side of the floor maintenance machine 100, or may be retractable. In this embodiment, a retraction cable 125 is connected to the alignment member 122. The retraction cable 125 is accessible from near the base of the battery assembly 108. Retractability of the alignment member 122 is useful to prevent interference with machine covers (not shown) and to prevent snagging loose objects during floor maintenance.

The floor maintenance machine 100 also includes a locking mechanism, generally indicated by reference numeral 120, attached to the docking side 106. The locking mechanism 120 is used to positively attach the machine 100 to a docking station to be described later herein. The locking mechanism 120 has a locking arm 130 with a hook shaped latching end 126 suitable for connecting with a protruding member on the docking station.

A lever handle 128 is attached between the machine 100 and the locking arm 130 of the locking mechanism 120. The lever handle 128 provides leverage to ensure positive mechanical engagement of the locking mechanism 120 onto the docking station. When the locking mechanism 120 is positively engaged on a docking station, the battery assembly 108 can be safely slid onto a receiving member of the docking station.

Figure 2:
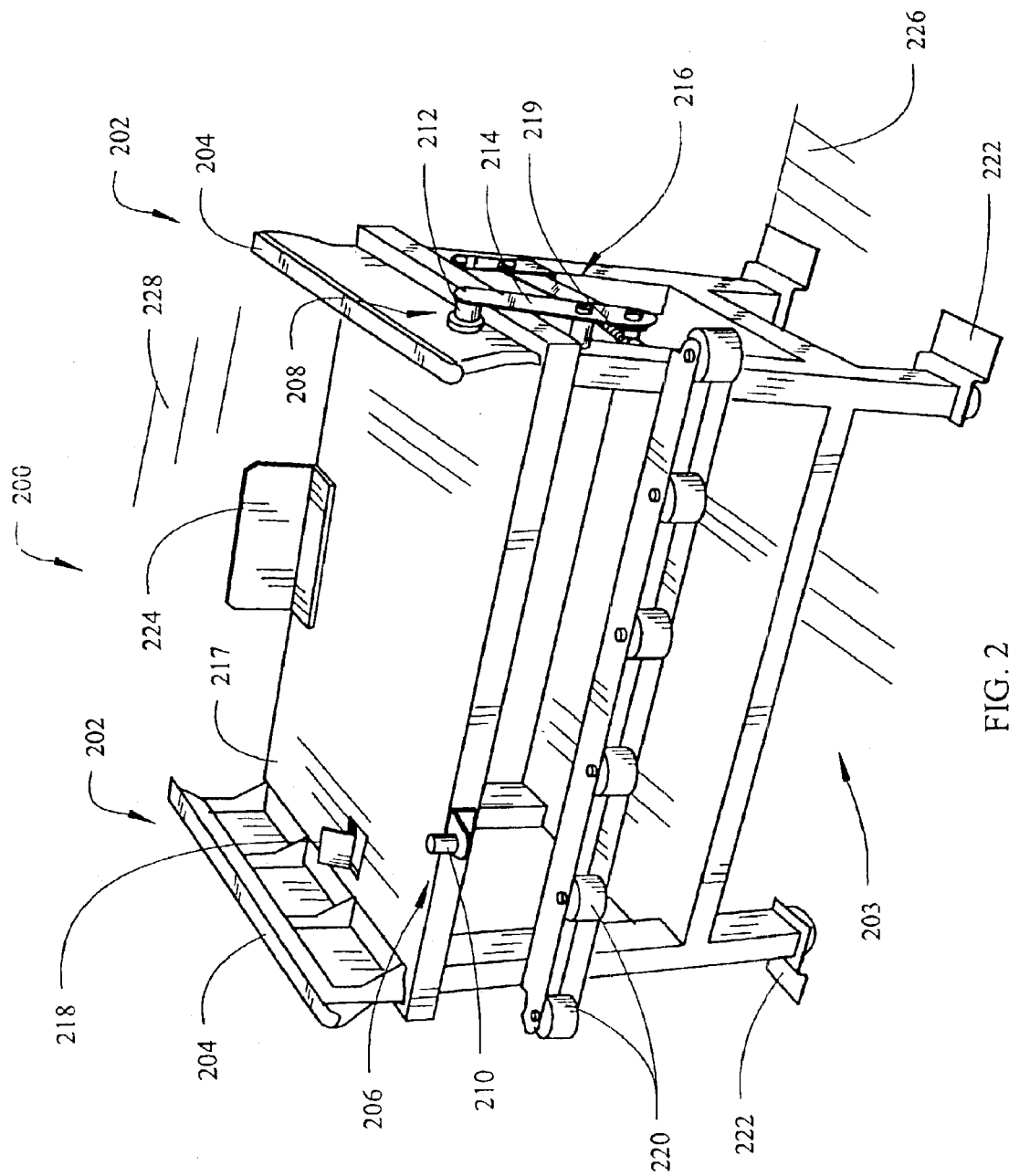
FIG. 2 is a perspective view of a docking station according to one embodiment of the present invention.

FIG. 2 illustrates an exemplary docking station, generally indicated by reference number 200. The docking station 200 includes at least one receiving member 202 accessible from a receiving side 203 of the station 200. In this example, the receiving member 202 includes a pair of rails 204. The rails 204 are spaced to align with the battery assembly wheels 118 when the floor maintenance machine 100 is attached to the docking station 200.

The docking station 200 includes an alignment receiving member 206 attached on the receiving side 203. The alignment receiving member 206 includes an alignment receiving pin 210 that protrudes so as to contact the alignment notch 124 of the floor maintenance machine 100. The docking station also has a lock receiving mechanism 208 attached at or near the receiving side 203. The lock receiving mechanism 208 includes a lock receiving pin 212. The lock receiving pin 212 can be mounted to the distal end of a pivot arm 214.

To ensure the battery assembly 108 remains fixably mounted in the docking station 200, a battery latching mechanism 216 is connected to the pivot arm 214. The battery latching mechanism 216 includes a latching arm 218 that protrudes upwards from a horizontal surface 217 of the docking station 200. The battery latching mechanism 216 is connected to the lock receiving mechanism 208 so that the latching arm 218 can hold the battery assembly 108 in place on the docking station 200 when no floor maintenance machine 100 is attached.

When the locking mechanism 120 of the floor maintenance machine 100 fully engages the lock receiving mechanism 208 of the docking station 200, the latching arm 218 is retracted, allowing a battery assembly 108 to be slid on or off the docking station 200. When the machine's locking mechanism 120 is disengaged, a spring 219 (best seen in FIG. 3) returns the lock receiving mechanism 208 and battery latching mechanism 216 to an initial orientation, thereby deploying the latching arm 218 to secure a battery assembly 108 on the docking station 200.

The docking station 200 may include other features to enhance ease of docking and/or to improve safety. A set of rollers 220 may be included along the receiving side 203 of the station 200. The rollers 220 assist in positioning the floor machine 100 so that the alignment member 122 properly connects with the alignment receiving member 206. The rollers 220 also help prevent damage to the machine 100 and station 200 during attachment procedures. The docking station 200 also includes foot mounting brackets 222 and side mounting brackets 224 for fixably attaching the station 200 to a floor surface 226 and a wall surface 228, respectively.

Figure 3:
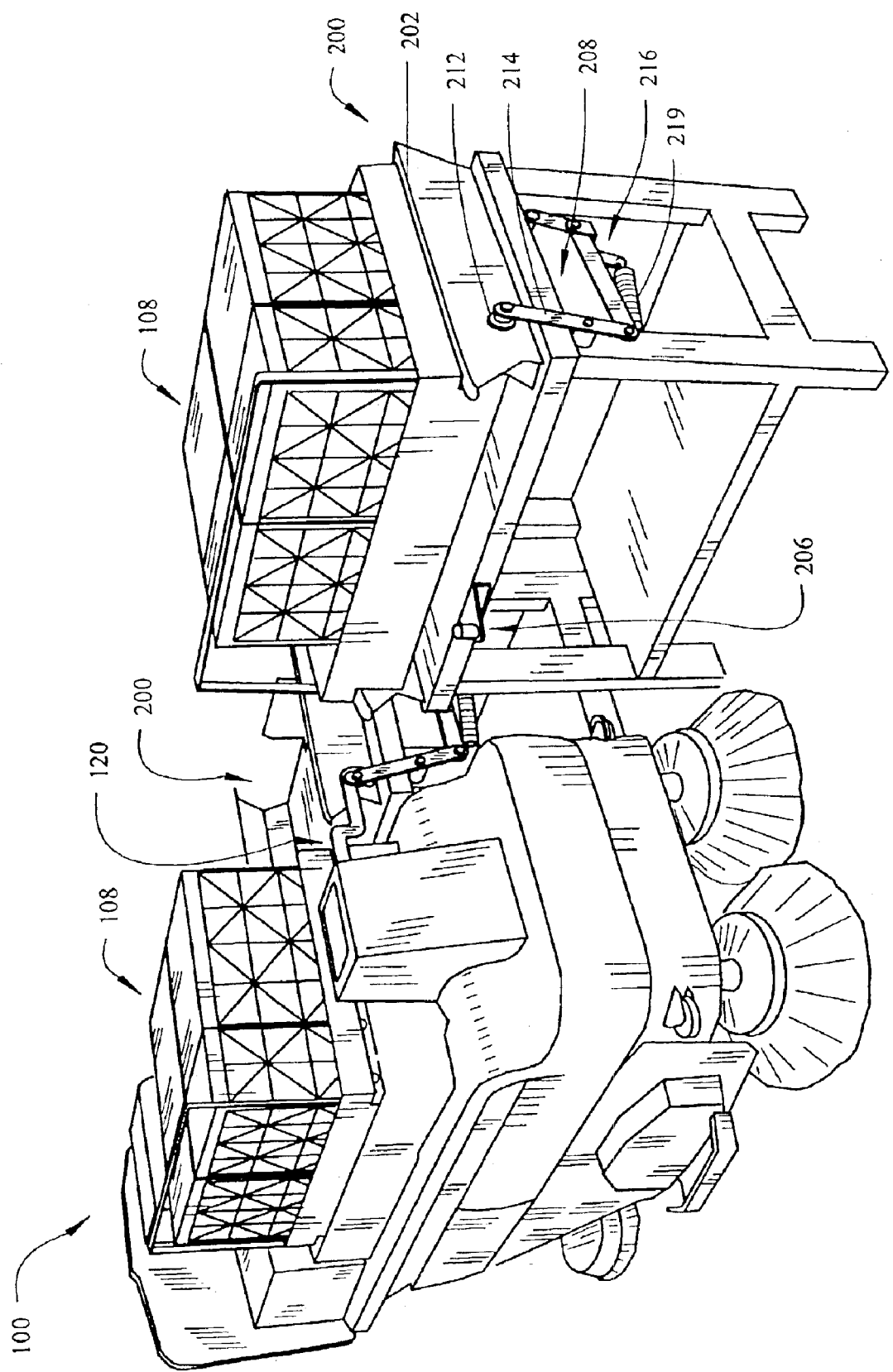
FIG. 3 is a perspective view of the floor maintenance machine attached to the docking station according to an embodiment of the present invention.

FIG. 3 illustrates a typical system useful for interchanging a battery assembly 108 from a floor maintenance machine 100. In this illustration, two docking stations 200 are provided. The leftmost docking station 200 is empty, ready to receive a spent battery assembly 108. The floor maintenance machine 100 is shown aligned and locked with the leftmost docking station 200. The rightmost docking station 200 has a battery assembly 108 (presumably charged) on the receiving member 202. Swapping the battery assemblies 108 involves moving the spent battery assembly 108 from the floor maintenance machine 100 to the leftmost docking station 200, then moving the charged battery assembly 108 from the rightmost docking station 200 to the floor maintenance machine 100.

FIGS. 4–7 illustrate the process of moving the battery assembly 108 from the floor maintenance machine 100 to the docking table 200 according to one embodiment of the present invention. The floor maintenance machine 100 is prepared by removing covers and (if needed) extending the alignment member 122 as shown in FIG. 1. As seen in the top view of FIG. 4, the floor maintenance machine 100 is maneuvered to align the docking side 106 of the machine 100 to the receiving side 203 of the docking station 200. One or more rollers 220 may be in contact with the floor maintenance machine 100. The floor maintenance machine 100 is in an alignment configuration when the alignment notch 124 of the alignment member 122 engages with the alignment receiving pin 210.

Figure 5:
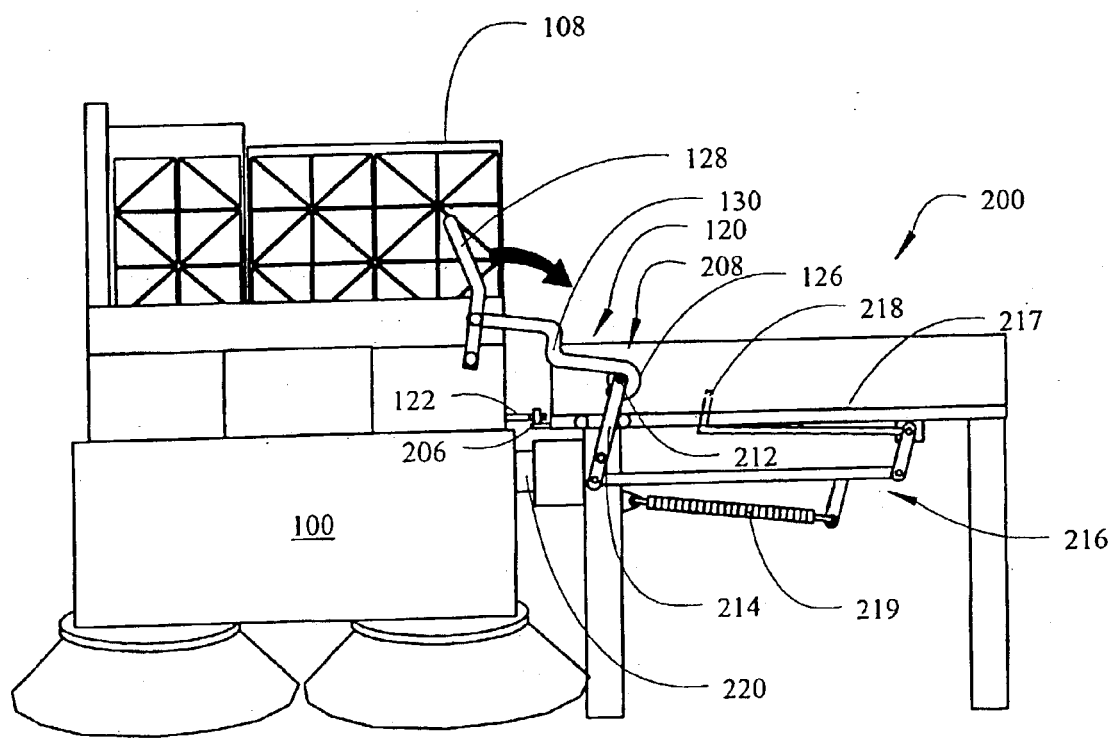
FIG. 5 is an end view of the floor maintenance machine prior to locking with the docking station according to an embodiment of the present invention.

The next step in docking the floor maintenance machine 100 is positively engaging the locking mechanism 120 with the docking station's lock receiving mechanism 208 as shown in FIG. 5. The locking arm 130 is extended by rotating the lever handle 128 in the direction shown by the curved arrow. The locking arm 130 is positioned so that the latching end 126 engages the lock receiving pin 212 of the lock receiving mechanism 208. It should be noted that in this initial orientation of the lock receiving mechanism 208, the battery latching arm 218 is protruding upwards through the docking station 200.

Figure 6:
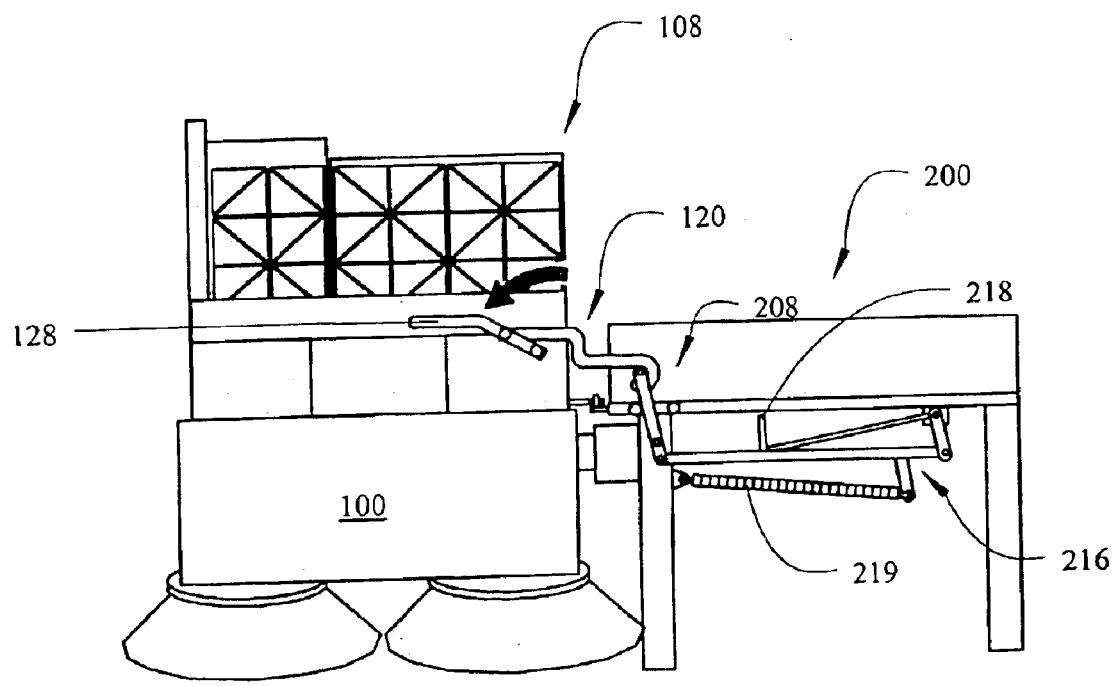
FIG. 6 is an end view of the floor maintenance machine after locking with the docking station according to an embodiment of the present invention.

Once the latching end 126 is engaged on the lock receiving pin 212, the lever handle 128 is rotated to tighten the assembly, and thereby positively connects the floor maintenance machine 100 to the docking station 200. This is shown in FIG. 6, where the lever handle 128 has been moved in the direction indicated by the curved arrow. The locking mechanism 120 can include mechanisms such as an over-travel and/or cam lobe to prevent disengagement once the lever handle 128 has been fully rotated.

When engaging the lock receiving mechanism 208, the battery latching mechanism 216 rotates the latching arm 218 downwards to clear the path for a battery assembly 108 to slide onto the docking station 200. This movement of the battery latching mechanism 216 also extends the spring 219 relative to the configuration shown in FIG. 5. When the locking mechanism 120 is disengaged, the spring 219 will retract, thereby moving the battery latching arm 218 back to the initial position shown in FIG. 5.

Figure 7:
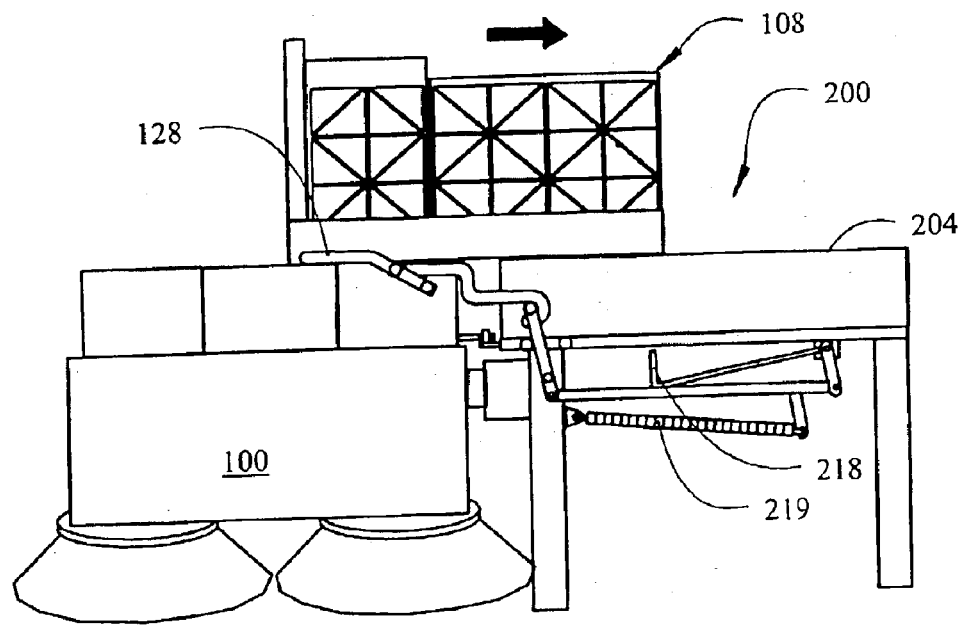
FIG. 7 is an end view of the floor maintenance machine wherein a battery assembly is being slid onto the docking station according to an embodiment of the present invention.

After the floor maintenance machine 100 has been aligned and locked (i.e. the system is in an attached configuration), the battery assembly 108 can be disconnected and moved onto the rails 204 of the docking station 200. This is shown in FIG. 7, where the battery assembly 108 is being slid in the direction of the bold arrow. Once the battery assembly 108 has been slid fully onto the docking station 200, it can be secured and prepared for charging. The floor maintenance machine 100 is disengaged from the docking station 200 by moving the locking mechanism lever handle 128 opposite the direction indicated by the curved arrow in FIG. 6 and disengaging the latching end end 126 from the lock receiving pin 212. The floor maintenance machine 100 can then be backed up to disengage the alignment member 122 from the alignment receiving pin 210.

Figure 4:
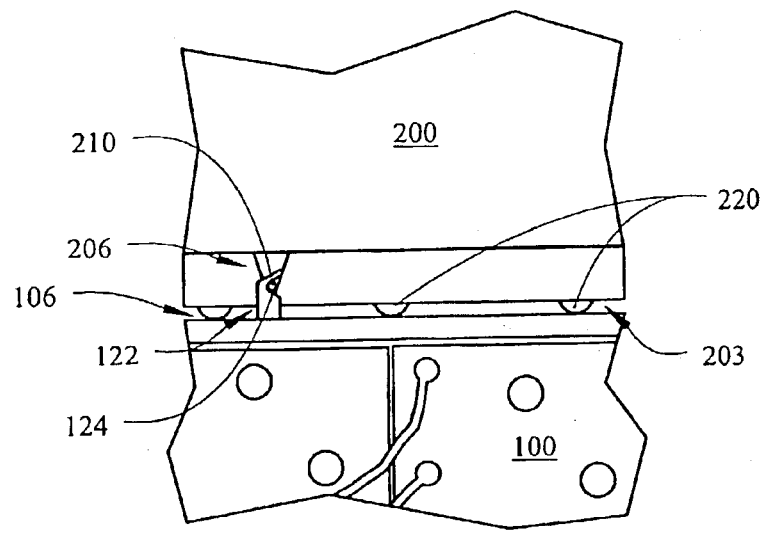
FIG. 4 is a top view of the floor maintenance machine aligning with the docking station according to an embodiment of the present invention.

When performing a change of battery assemblies 108, a second docking station 200 will typically be available, the second docking station 200 having a fully charged battery assembly 108 on the rails 204. After removing the discharged battery assembly 108 from a floor maintenance machine 100 as described above, the machine 100 is maneuvered and locked to the second docking station as shown in FIGS. 4–6. Note that in the remaining steps of the procedure, the battery assembly 108 will reside on the docking station 200 and not on the floor maintenance machine 100 as shown in FIGS. 4–6.

After locking the floor maintenance machine 100 to the docking station 200, the charged battery assembly 108 is slid from the docking station 200 to the floor maintenance machine 100 in a direction opposite that shown by the bold arrow in FIG. 7.

Once the charged battery assembly 108 has been slid onto the floor maintenance machine 100, the battery assembly 108 can be secured and connected. The floor maintenance machine 100 is disengaged from the docking station 200 as previously described, and can be returned to service.

Figure 8:
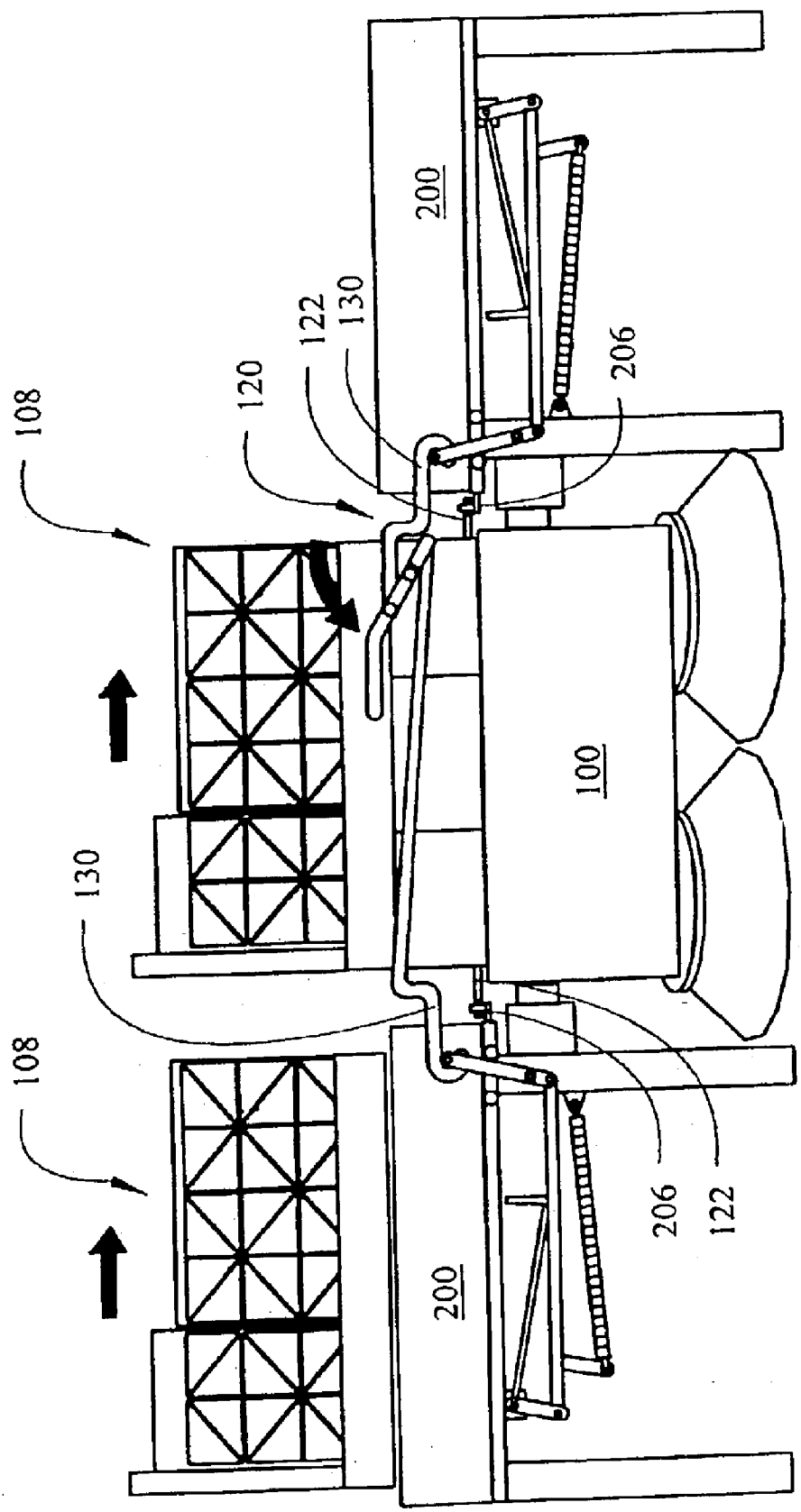
FIG. 8 shows an alternate arrangement of the floor maintenance machine and docking tables according to an embodiment of the present invention.

Referring now to FIG. 8, an alternate arrangement of the floor maintenance machine 100 and the docking stations 200 is shown. In this embodiment, the docking stations are arranged with the receiving sides 203 facing each other. The floor maintenance machine 100 includes alignment members 122 and locking arms 130 on both sides. The docking stations 200 are arranged so that the floor maintenance machine 100 is maneuvered between the two docking stations 200.

The floor maintenance machine 100 is positioned between the docking stations 200 so that the alignment members 122 engage with the alignment receiving members 206. Following alignment, one or more locking mechanisms 120 engage lock receiving mechanisms 208 on the docking stations 200. Although docking of the machine 100 between the stations 200 is likely more difficult in this arrangement than previously described embodiments, the resulting battery swapping operation only requires a single docking maneuver. Once the machine 100 is docked/atached, the rightmost (spent) battery assembly 108 is slid onto the right docking station 200, and the leftmost (charged) battery assembly 108 is slid onto the floor maintenance machine 100. The floor maintenance machine 100 is then unlocked and backed out.

It is appreciated various alternative arrangements of a docking station 200 can be used in a system according to the present invention. For example, a single docking station 200 having two or more receiving sides 203 can be used in place of two docking stations as described herein. Also, the docking station 200 can have a plurality of receiving members 202 and lock receiving mechanisms 208, each of the receiving members 202 and lock receiving mechanisms 208 being adapted to different configurations of maintenance machines.

It will, of course, be understood that various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. An electrically powered floor maintenance machine, comprising:

a battery assembly slidably attached between a front end and a back end of the floor maintenance machine;

a docking side, the battery assembly slidable away from the floor maintenance machine at the docking side;

a locking mechanism attached to the docking side of the floor maintenance machine;

wherein the docking side of the floor maintenance machine is alignable with a docking station so that the locking mechanism is engagable with the docking station, the battery assembly slidable from the floor maintenance machine to a slidable receiving member of the docking station when the locking mechanism is engaged with the docking station and wherein the machine further comprises an alignment member attached to the docking side of the floor maintenance machine, the alignment member slidably connectable to an alignment receiving member of the docking station and wherein the alignment member is retractable within the floor maintenance machine.

2. The floor maintenance machine of claim 1, wherein the locking mechanism comprises a locking arm with a hook-shaped attachment end and a lever handle pivotably attached to the floor maintenance machine and the locking arm, the hook-shaped attachment end engaging a lock receiving mechanism on the docking station.

3. A method of interchanging a first battery assembly from an electrically powered floor maintenance machine, comprising:

maneuvering the floor maintenance machine to align a docking side of the floor maintenance machine to a first docking station by slidably engaping an alignment member of the floor maintenance machine with an alignment receiving member of the first docking station and by maneuvering the floor maintenance machine to contact a set of rollers on the first docking station;

engaging a locking mechanism of the floor maintenance machine with a lock receiving mechanism of the first docking station to positively attach the floor maintenance machine to the first docking station;

sliding the first battery assembly from the floor maintenance machine to the first docking station to unload the first battery assembly; and disengaging the locking mechanism to release the floor maintenance machine from the first docking station.

4. The method of claim 3, wherein engaging the locking mechanism of the floor maintenance machine with a lock receiving mechanism of the first docking station also disengages a battery latching mechanism of the docking station to allow the first battery assembly to slide onto the docking station.

5. The method of claim 3, wherein disengaging the locking mechanism also engages a battery holding mechanism of the docking station to prevent the first battery assembly from sliding on the docking station.

6. The method of claim 3, further comprising:

maneuvering the floor maintenance machine to align the docking side of the floor maintenance machine to a second docking station;

engaging the locking mechanism of the floor maintenance machine with a lock receiving mechanism of the second docking station to positively attach the floor maintenance machine to the second docking station; and sliding a second battery assembly from the second docking station to the floor maintenance machine to load the second battery assembly.

7. A floor maintenance system, comprising:

an electrically powered floor maintenance machine, comprising:

a battery assembly slidably attached to the floor maintenance machine, the battery assembly slidable away from a docking side of the floor maintenance machine;

a locking mechanism on the docking side of the floor maintenance machine; a docking station, comprising:

a receiving side, an alignment of the receiving side with the docking side of the floor maintenance machine defining an alignment configuration of the floor maintenance system;

a battery receiving member for slidably receiving the battery assembly of the floor maintenance machine;

a lock receiving mechanism positively connectable to the locking mechanism of the floor maintenance machine in the alignment configuration of the floor maintenance system, a positive connection of the locking mechanism with the lock receiving mechanism defining an attached configuration of the floor maintenance system, said machine further comprising an alignment receiving member on the docking side and the docking station further comprises an alignment receiving member, the alignment member slidably connectable to the alignment receiving member in the alignment configuration of the floor maintenance system, and wherein the alignment receiving member of the docking station comprises an alignment receiving pin and the alignment member of the floor maintenance machine comprises an alignment arm with an alignment notch, the alignment notch slidably connectable with the alignment receiving pin and wherein the alignment member is retractable within the floor maintenance machine.

8. The floor maintenance system of claim 7, wherein the docking station further comprises a plurality of rollers on the receiving side of the docking station, at least one of the rollers contacting the floor maintenance machine in the alignment configuration of the floor maintenance system.

9. The floor maintenance system of claim 7, wherein the docking station further comprises a battery latching mechanism that prevents sliding of the battery assembly on the battery receiving member when the floor maintenance system is not in the attached configuration, the battery latching mechanism allowing sliding of the battery assembly on the battery receiving member in the attached configuration of the floor maintenance system.

10. The floor maintenance system of claim 9, wherein the battery latching mechanism is connected to the lock receiving mechanism of the docking station so that the battery latching mechanism allows sliding of the battery assembly on the battery receiving member when the lock receiving mechanism is positively connected to the locking mechanism of the floor maintenance machine.

11. The floor maintenance system of claim 7, wherein the locking mechanism of the floor maintenance machine comprises a locking arm with a hook-shaped attachment end and a lever handle pivotably attached to the floor maintenance machine and the locking arm.

12. The floor maintenance system of claim 11, wherein the lock receiving mechanism comprises a receiving pin.

13. The floor maintenance system of claim 7, wherein the battery receiving member comprises a pair of rails.

* * * * *